July 31, 1951 J. B. TEGARTY 2,562,751
PLASTIC CLOTHESPIN
Filed Dec. 22, 1947 2 Sheets-Sheet 1

INVENTOR,
JOHN B. TEGARTY
BY
Justin C. Macklin
ATTY

July 31, 1951　　　J. B. TEGARTY　　　2,562,751
PLASTIC CLOTHESPIN

Filed Dec. 22, 1947　　　　　　　　　　　2 Sheets-Sheet 2

INVENTOR,
JOHN B. TEGARTY
BY
　　　　　*Justin W. Macklin*
　　　　　　　ATTY

Patented July 31, 1951

2,562,751

UNITED STATES PATENT OFFICE 2,562,751

PLASTIC CLOTHESPIN

John B. Tegarty, Mentor, Ohio, assignor to Justin W. Macklin, Cleveland, Ohio, trustee Application December 22, 1947, Serial No. 793,251

3 Claims. (Cl. 24—137)

This invention relates to clothespins of the general character of that shown, described and claimed in my copending application, Serial No. 719,878, filed January 2, 1947, and now issued as Patent No. 2,433,171, dated December 23, 1947.

The general objects of the present invention are to increase the strength of the pin with relation to the amount of plastic material of which the pin is molded while maintaining flexibility of the gripping action.

Such pins are formed by injection molding processes in which the material is caused to flow under high pressure into a mold. A further object of the invention is to so design the pin as to cause the flow of material to be such that the pin will attain the greatest possible strength by reason of predetermined flow lines, balanced internal strains, and by effecting the welding of a plurality of streams of the material, forming the leg members, at positions on the pin least subject to breakage.

More specifically, the pin comprises essentially inner and outer leg members, that is, two leg members at either side of the clothesline-receiving slot. An object of the invention is to join these members at the upper or closed end of the slot in such a fashion as to form a plurality of mutually reinforcing arch members merged into a single arch, which may be formed to provide a handle or to which a handle or shank is joined.

A further specific object is to so design the pin that the flow of the liquid or plasticized material forming the pin will be so divided at the arches that it may fill the four die channels for forming the leg members, and at relative rates of flow in the inner and outer members such that the weld occurs below or outside of the inner members.

Still another object, therefore, is to so proportion the cross sectional area of the inner legs that they may provide the desired flexibility and be of such shape that the flow of material, through the channels of the cavity forming these inner members, will tend to be slightly more rapid than the corresponding flow in the outer members. That is, the flow of the several members should be such as to preclude the plasticized material in liquid form from meeting along the reaches of the inner members. As will hereinafter appear the inner members of the legs are tension members, while the outer members of the legs are essentially compression members, as was set forth in my prior application, above designated.

Other objects and advantages will become apparent in the following description which relates to the accompanying drawings.

Figure 3:
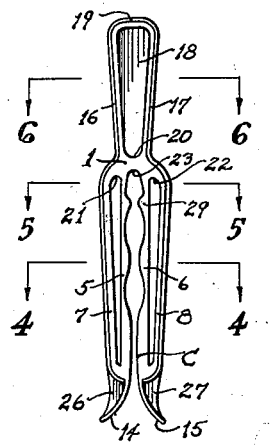
Fig. 3 is an elevation at right angles to the view of Fig. 2.
Figure 4:
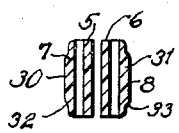
Figure 5:
Figure 6:
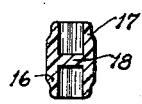
Figure 7:
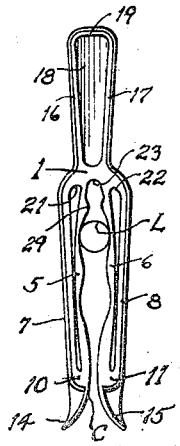
Figure 8:
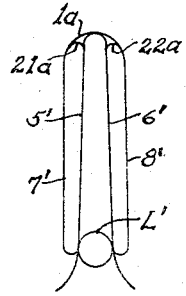
Figure 9:
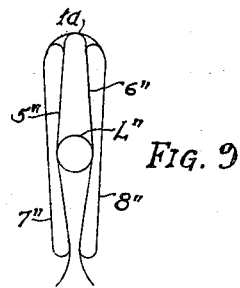
Figure 10:
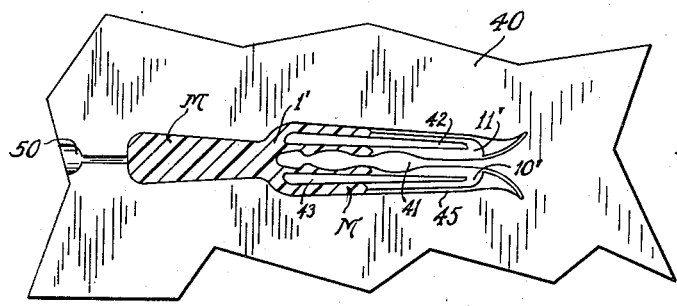
Figure 11:
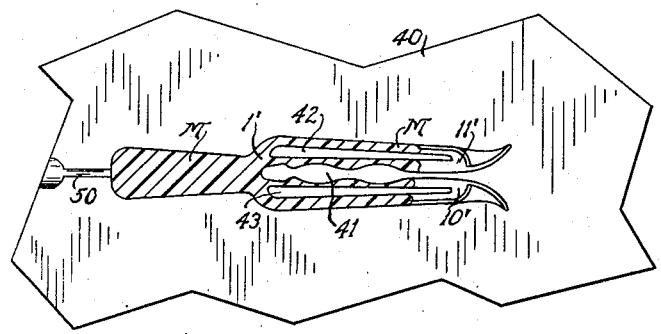
Figure 12:
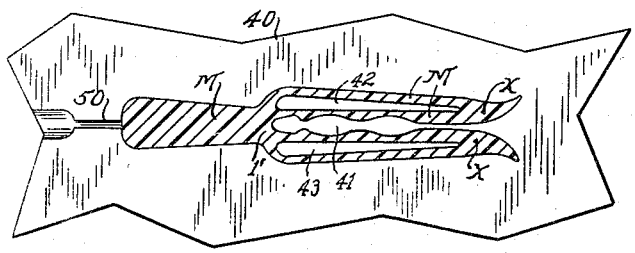

Figs. 4, 5 and 6 are transverse sections taken on the planes indicated by the lines 4—4, 5—5 and 6—6, respectively, of Fig. 3;

Fig. 7 is a view similar to Fig. 3, showing the position of the parts with a clothesline in the upper portion of the slot;

Figs. 8 and 9 are diagrammatic views indicating the action of the gripping surface members with relation to the outer members comprising the legs of the pin;

Figs. 10, 11 and 12 are views of a die cavity member showing the die cavity and gate arrangement at the handle, and showing successive positions of the material flowing into the cavity to form the completed pin.

The structure comprises essentially a composite or triple arch member 1 formed integrally with inner clothesline gripping slot members 5 and 6 and outer leg members 7 and 8. These four members extend from the composite arch structure 1 and merge with uniting end sections 10 and 11, below which the inner surfaces may be continued by outwardly extending lip members 14 and 15 shaped to form suitable flaring guides to facilitate placing the pin over clothes or material on the clothesline.

While the composite arch may of itself be shaped to serve as a suitable handle, I prefer to form a handle which shall serve to facilitate using the clothespin and which shall be so proportioned that the flow of the plasticized material may be accomplished in a manner to attain the objects above set forth, and whereby the gate to the clothespin die cavity may be connected to the upper portion of the cavity forming such a handle.

It will be noted that the members 5, 6, 7 and 8 comprising the leg portions are wider than the thickness of a clothesline. This width is of a dimension preferably two or more times that of the diameter of a clothesline.

The handle comprises essentially two members preferably of such width that their edges form continuations of the edge surfaces of the members 5, 6, 7 and 8 and of the composite arch 1.

The handle side members are designated 16 and 17 and are connected by an intermediate member in the nature of a transverse web 18, while the side members are continued and joined over the top of the handle at 10 to form a flattened loop. The web 18 is preferably somewhat thicker than the side members 16 and 17.

Figure 1:
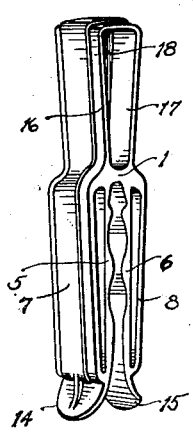
Fig. 1 is a perspective view of the clothespin structure.
Figure 2:
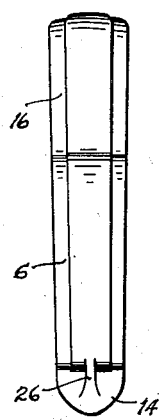
Fig. 2 is a side elevation of the same.

It will be noted that the side surfaces of the pin are shown (Fig. 2) as being slightly tapered, for the sake of appearance. The outer faces of the pin and handle lie in the direction of the length of the clothesline, which facilitates handling the pin to place it on the line.

The functional characteristics and method of making the pin lend themselves to modifications of external appearance as is illustrated by design patents granted to me March 8, 1949, as follows: Des. 153,047, Des. 153,049, and Des. 153,048. The last-named design patent corresponds approximately to the appearance shown in the present application.

The lower portion of the handle side members 16 and 17 merge in a reverse curve with the side members 7 and 8, and at the inner side they are connected by an arched curve 20 at the upper side of the composite arch 1.

The inner and outer leg members have their adjacent surfaces substantially flat and separated by spaces shown as tapering and flaring upwardly slightly to curved surfaces at 21 and 22, each formed by an arch, one at either side of the central arch 23. As will be seen the central arch is in the nature of a bridge joining the inner leg members 5 and 6 with the composite arch 1.

These spaces between the leg members 5 and 7, and 6 and 8, are slightly narrower at the points of juncture 10 and 11, where the outer surface of the legs turn inwardly around the lower ends of the spaces, as shown, thus forming the merging juncture of the inner and outer legs and the flaring lips or feet 14 and 15.

If desired fillets or bracing members 26 and 27 may be formed centrally of the lip extensions 14 and 15, and at their outer sides, as shown.

The flaring curvature of the inner surfaces of the lips 14 and 15 extend upwardly into the clothesline-receiving slot in a gradual sweep, such as indicated at C, each merging with undulations or thinner portions, of which there may be two or more forming clothesline-receiving recesses.

At the upper end of the clothesline-receiving slot is a converging space preferably so shaped as to grip a small clothesline with thin cloth thereon. The curvatures of the portions C leave strong thickened portions extending above the joining points 10 and 11. Inwardly projecting serrations or humps as at 29 serve to limit the downward movement of the pin over thick material, thus tending to reduce the spreading or splitting action, and normally holding or stopping the usual size line in the position shown at L in Fig. 7.

The outer leg members may be of any desired shape, but as shown they are provided with slightly thickened intermediate portions 30 and 31, forming shoulders 32 and 33 spaced inwardly from the sides of the pin.

Referring to Fig. 8, the circle L' indicates an extra large clothesline which may or may not have material thereon while the lines 5', 6', 7' and 8' represent diagrammatically the inner and outer legs and their positions as the pin first engages the clothesline. At this point the clothes and line are at the greatest distance from the composite arch, and the angle of spreading is the narrowest or most acute for a given bulk or size embraced thereby, thus causing a minimum of strain at the composite arch 1a joining the leg members at their upper ends.

In this position there is little or no relative movement between the leg members and no strain on the arch portions 21a and 22a.

As the bulk of the line L'' reaches an intermediate position, as indicated in Fig. 9, the flexibility of the inner members permits them to bend and spread to positions shown at 5'' and 6''. It will be noted that this is like the action of bow strings putting their inner members in tension and actually tending to pull inwardly, drawing the lower ends of the outer members 7'' and 8'' inwardly rather than increasing the spreading action of the outer legs. This minimizes the strain on the composite arch 1a.

If such a line or bulk diameter of material is urged upwardly tending to spread the upper portion of the inner members 5 and 6 to a wider angle, as is the condition shown in Fig. 7, the upper portions of these inner leg members 5 and 6 spread the inner arch 23 somewhat more, while tending to close or narrow the subordinate arches 21 and 22. At this time the outer legs, reaching to and supporting the lower ends of the inner legs, serve as reinforcements for them and the bow string or tension action of the inner members tends to pull the lower end of the slot closed. This action serves as added protection against splitting the pin at the composite arch.

The merging of the handle with the composite arch affords additional strength to the arch structure.

The resulting pin is capable of strong gripping action over a large diameter of line and material thereon. The following comparative advantages are attained:

When made of polystyrene and of about one-eighth ounce in weight, my new clothespin does not split under conditions which would split a good conventional wooden clothespin. In fact, it is very difficult with one hand to so force the clothespin over bulky material on a clothesline as to endanger the pin.

The spring action and flexibility are such that varying degrees of desired gripping action may be attained and the facility with which it may be pushed over the pin and over the line and material and of removing it therefrom is markedly improved over conventional, rigid, two-legged clothespins—whether of wood, plastic, or other material.

The injection molding of the structure heretofore described is accomplished essentially in a conventional manner of gating the material to a cavity formed with one half in each of two meeting die members.

Referring to Figs. 10, 11 and 12, a die member 40 is shown as having a cavity 45 forming one half of the clothespin dividing along a medium plane transversely of the clothesline slot of the same.

The gate passage 50—preferably formed in one of the die members—is shown as leading to the cavity at the portion forming the top of the handle.

Assuming that two such die members are closed, with their cavities in registration, material in liquid or plasticized condition is forced through the gate passages under the usual very high pressure to each cavity. The material fills the handle space and cavity for the composite arch 1, and then flows along the portions of the cavities, which are in the nature of channels forming the inner and outer leg members 5, 6, 7 and 8.

Thus, as will be seen by referring to Fig. 10, the material M is shown as having filled the handle and as advancing down the channels forming the leg members, the streams being slightly longer on the inner members than on the outer members of that stage.

Fig. 11 shows the continuation of this flow of material M. Here it will be seen that the material in the inner passages is still slightly ahead of that in the passages for the outer leg members. It will be noted that the material flowing in the outer leg passages must now come to and flow around the curves forming the joining points 10 and 11, as indicated in Figs. 10 and 11 as 10' and 11', while the streams of the material forming the inner legs continue uninterruptedly and slightly more freely, reaching the leg joining portions of the cavity and causing the welding with the outer streams along weld lines not shown, but occurring at positions such as indicated at X—X, Fig. 12, in the mass forming the joints or juncture portions 10 and 11.

Referring to Fig. 3, for example, it will be noted that the side portions 16 and 17 of the handle are substantially in alignment with the inner legs and thus some of the flow normally starts first down the channels for forming the inner leg members, while the flow down the outer leg members occurs after filling the space for the composite arch 1. The path for the outer members is slightly longer than that for the inner members, thus further assuring that in the filling of the mold to the extent of welding the streams forming each pair of inner and outer leg members will bring the weld lines below the space between the inner and outer leg members (at the right of Figs. 10 to 12).

A conventional method of making such a cavity as that shown is to cut one half of the cavity into and below each surface of two die plates. The space for the line slot is formed by a tongue 41 of the material of the die plate, or by a rigidly inset piece, as is the case with the spaces between the leg members which are formed by metal inserts, 42 and 43, rigid with the die members.

It is not the purpose of the present application to patent such die construction, but in this respect it is believed to be novel to so construct a clothespin, having inner and outer leg members, as to prevent the welding of the dividing streams filling the cavity from occurring along the inner leg members.

In the development of my pin it had been found that breakage frequently resulted whenever these weld lines were in the inner leg members, and that by the present design breakage of the inner members even under severe stress has been largely eliminated, and a stronger pin has resulted.

The thickened portions of the material of the composite arch form, in effect, continuations of the strip-like elements of the legs and handle sides, and the thickness of the material of the arch, at any one point, is only slightly greater than the material forming these strip-like elements.

By thus holding the bulk or thickness at the arch to a minimum while attaining the desired strength, I gain additional advantages in economy of material used and may shorten the cooling period of the molding operation with resulting shorter molding cycles and consequent increased production.

Also, internal strains, which might tend to weaken the pin or cause its distortion after removal from the mold, are avoided.

Various modifications may be made in the structure and contour of the sections while attaining the objects of this invention and without departing from the spirit and scope of my invention as defined in the appended claims.

Having thus described my invention, what I claim is:

1. A unitary thermo-plastic clothespin structure comprising two U-shaped loops, one substantially inside of the other, the legs of the inner loop being in the nature of flat flexible strips forming a clothesline-receiving slot, a composite arch structure joining the U-loops at their closed ends and including an arch between the inner legs and an arch merging tangentially therewith and joining the legs of the outer loops and including intermediate arches between the adjacent ends of the legs of the inner and outer loops, the composite arch structure having a sectional thickness substantially no greater than twice the thickness of one of said inner strips, and integral weld connections joining each inner leg to the adjacent leg of the outer loop at the open ends of the U-loops at points outside of the inner strips.

2. A unitary injection molded clothespin having two spaced apart leg members of substantially flat cross section and forming a clothesline-receiving slot, reinforcing members extending longitudinally of the leg members at the outer sides of the leg members and spaced therefrom, a composite arch structure at the top of the slot and comprising an inner arch loop connecting the inner leg members, a portion connecting the outer leg members and merging tangentially with the inner arch loop, and curved portions forming arches between the tops of the inner and outer leg members and also tangential with the arch portion connecting the two outer leg members, all portions of the arch structure having a narrow elongated cross section parallel with a clothesline when normally engaged in said slot, the structure being such that the inner members are capable of flexing outwardly relative to the reinforcing members and thereby exerting inward and upward tension on the outer ends of the reinforcing members, and whereby the inner arch loop may be spread by engagement with the clothesline and material thereon to a greater degree than the outer portion of the composite arch structure, the clothesline-gripping members and the reinforcing members being joined by welding along transverse lines substantially parallel with the normal direction of the clothesline and located outside of and beyond the lower ends of the inner clothesline-gripping leg members.

3. A unitary thermo-plastic clothespin structure comprising a handle portion and legs attached thereto and formed in the nature of four substantially parallel strips, the inner strips serving as the clothesline-gripping means and being joined with the outer strips and with the handle, and also being joined with the outer strips at the open end of the clothesline-receiving slot, the inner strips being flexible relative to the outer strips and the outer strips thus serving as reinforcing bracing members, the inner strips being capable of flexing movement between their ends outwardly toward the outer strips and being so proportioned that such flexing exerts a tension upon and longitudinally of the outer strips, and the inner strips being joined to the outer strips by the welding of the material at points beyond the ends of the inner strips at the open end of the clothesline slot.

JOHN B. TEGARTY.

REFERENCES CITED

The following references are of record in the file of this patent:

UNITED STATES PATENTS

| Number | Name | Date |
|---|---|---|
| 186,055 | Mihan | Jan. 8, 1877 |
| 1,162,578 | De Forge | Nov. 30, 1915 |
| 2,196,815 | Sawyer | Apr. 9, 1940 |
| 2,433,171 | Tegarty | Dec. 23, 1947 |